United States Patent [19]
Barker

[11] 4,035,766
[45] July 12, 1977

[54] ERROR-CHECKING SCHEME

[75] Inventor: William B. Barker, Maynard, Mass.

[73] Assignee: Bolt, Beranek and Newman, Inc., Cambridge, Mass.

[21] Appl. No.: 601,145

[22] Filed: Aug. 1, 1975

[51] Int. Cl.² .................. G06F 11/10; G11C 29/00; H04L 1/10
[52] U.S. Cl. .............. 340/146.1 AG; 235/153 AM
[58] Field of Search .......................... 235/153 AM; 340/146.1 AG

[56] References Cited
U.S. PATENT DOCUMENTS 3,789,204  1/1974  Barlow ........................ 235/153 AM

*Primary Examiner*—R. Stephen Dildine, Jr.
*Attorney, Agent, or Firm*—Kenway & Jenney

[57] ABSTRACT

The error-checking scheme disclosed herein is adapted for use in digital data processing systems, e.g. computers, in which binary data is variously transmitted and/or stored and in which the data source or destination is designated by a binary address. In a preferred embodiment, the data is divided into two fields and a respective parity bit is generated corresponding to each data field. Each data parity bit is then combined with a parity bit corresponding to the binary address to yield a respective combinational parity bit. Each of the resultant combinational parity bits is then sourced with the respective data field. Accordingly, a system sub-component receiving the sourced data with the combinational parity bits can detect any type of single error occurring in either the address or the data.

5 Claims, 3 Drawing Figures

ERROR-CHECKING SCHEME

BACKGROUND OF THE INVENTION

The present invention relates to an error-checking scheme for digital data processing systems and more particularly to such a scheme employing a pair of parity bits which enable the detection of most common errors occurring in either data or address.

Digital data processing systems, as that term is presently understood, involve the rapid and repetitive transmission of data in binary form as well as the periodic storage and recall of such data. In both the transmission and storing of data, the destination of the binary data is typically designated by an address which is also coded in binary form. In the calling forth of such data either from storage or from an originating source operative on demand, the source is designated by an address, again coded in binary form. Thus, at any given time, there is typically associated with any basic quantity of binary data a corresponding binary address. This is particularly true in modern so-called mini-computer systems in which most data communication takes place over a common bus interconnecting all of the sub-components of the computer system. In such systems, peripheral devices, such as disk and tape memories and, graphic systems, modems and other input/output devices, are assigned addresses which are, for most internal purposes, comparable to the designations given to locations or addresses in the usual random access central memory for the computer.

In handling binary data, the most standard or common grouping of data is the "byte" usually considered to be 8 individual binary bits. Correspondingly, memories for use with digital data processing systems are typically organized so that each address stores either a byte or a multiple number of bytes. In order to check whether data has been properly stored and/or recalled from a computer memory, it has been relatively common practice to generate and store with each byte an additional or ninth bit designated a parity bit. The value of the parity bit is typically set so that the total number of positive or true bits will be either always even or always odd, depending upon the particular design employed. As is understood, such a bit can be generated from the data byte by a tree structure of exclusive OR gates. Such parity bits have also typically been utilized to check the accuracy of transmission of binary data over communication links of various types. In the case of either the memory or the transmission link, the receiving component then can independently generate a parity value from the data received and compare that with the parity bit sourced with the data.

Except in automatic error correction systems, typically requiring relatively elaborate, special-purpose circuitry, most parity systems proposed heretofore have employed multiple parity bits only when multiple byte data words are being processed, each parity bit being associated with the respective data byte only. Similarly, when messages including addresses have been communicated, it has been proposed to provide parity bits for all data being communicated, including binary addresses, but again with each parity bit being associated with a corresponding byte of the binary data including those bytes constituting the address.

While the parity systems described above have been useful and widely adopted, it has been accepted that there are various types of failures and losses of data which such systems will not detect. In memory systems, for example, there are four types of errors which are not uncommon. Herein, the phrase "not common" must be understood as a relative term since the success of digital data processing systems generally is predicated on the very high degree of reliability obtainable in processing digital signals, as compared with analog signals.

The first type of failure is that a single bit in the stored byte will be improperly stored or recalled. As is understood, the chance of two bits within a byte being wrong is almost astronomical since the probability is based on the square of the probability of a single bit failure. A second type of failure which can expectably occur is that the byte will be returned as all "zeros" due to a particular class of malfunction affecting that memory location. Correspondingly, a third type of failure is that the byte will be read out as all "ones" due to a similar class of failure. A fourth type of failure which can occur is that the memory will read out of the wrong address, either due to a failure of communicating the address to the memory or due to an internal failure within the memory itself. As is understood by those skilled in the art, it is mathematically provable that no one bit parity check can detect all of these types of failure in a binary word with an even number of bits, e.g. a byte. Corresponding failures can occur in communications systems and, again, the same difficulty in reliably detecting all such failures with a single bit parity check exists.

Summary of the Invention

Briefly, the error-checking scheme of the present invention is applicable to digital data processing systems having subcomponents which source and receive digital data, the data comprising a binary word divisible into at least two fields, with the data source or destination being designated by a binary address. In accordance with the present scheme, a parity bit A is generated which corresponds to the binary address. A parity bit D1 is generated corresponding to a first data field while a parity bit D2 is generated corresponding to a second data field. A combinational parity bit AXD1, corresponding to the XOR product of A and D1, is generated and sourced with the first data field while a combinational parity bit AXD2, corresponding to the XOR product of A and D2, is generated and sourced with the second data field. With combinational parity bits of this type sourced with the two data fields, a system sub-component receiving the sourced data can detect the occurrence of most common errors in either address or data.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
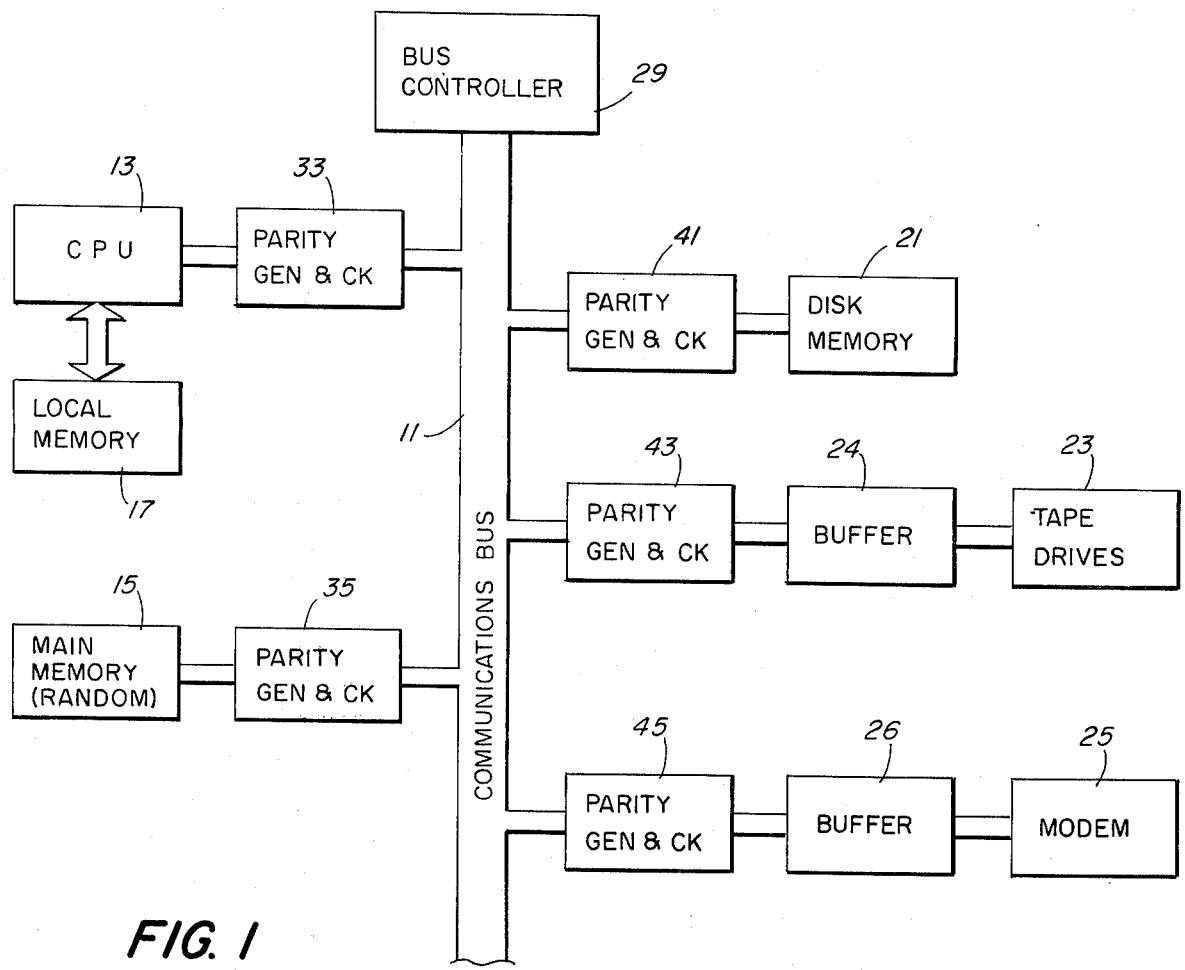
FIG. 1 illustrates a data processing system employing an error-checking scheme in accordance with the present invention.

Referring now to the drawings, there is illustrated generally in FIG. 1 a digital data processing system, i.e. a computer, to which the error-checking scheme of the present invention is applied. The data processing system of FIG. 1 is organized around a central bus 11 which is utilized as a communications path for most transfers of data within the system. Computational ability is provided in the usual sense by a CPU (central processing unit). As is usual, the system comprises a main memory 15 which is of the random access type and which is either core memory or semiconductor memory in most modern systems. However, the CPU 13 may also be conventionally provided with a scratch pad or local memory 17 which is utilized for providing sub-routines and commonly utilized functions thereby to reduce the number of accesses which must be made to the main memory 15.

In typical systems, peripheral devices such as a disk memory 21, tape drives 23, and a modem 25 for communications purposes may also be coupled to the internal communications bus 11. The bus 11 thus provides a communications path between the CPU 13 and these peripheral devices as well as with the main random access memory 15. In order to permit transfers between the main memory and the peripheral devices to proceed without loading or otherwise utilizing the central processing unit 13, the bus 11 may be provided with a separate controller, designated 29, which permits direct bulk transfers of data between the main memory and the various peripherals to proceed while the central processing unit is working on data and instructions previously obtained. To permit data to be accommodated in relatively large batches compatible with the operating speed of the main memory, slower peripherals such as the tape drives and modem may be provided with respective buffers as indicated at 24 and 26. Computer systems of this general organization are sold by the Digital Equipment Corporation of Maynard, Massachusetts under its trademark UNIBUS and systems also of this general character are sold by Lockheed Electronics of Burbank, California under its trademark INFIBUS. The organization of the Digital Equipment Corporation UNIBUS system is described in some considerable detail in U.S. Pat. No. 3,710,324 issued to John B. Cohen et al. on Jan. 9, 1973 and entitled Data Processing System.

In accordance with the practice of the present invention, parity-generating and checking circuitry 33 is interposed between the CPU 13 and the bus 11 and similar parity-generating and checking circuits are interposed between the bus and the main memory 15 and each of the peripheral devices 21, 23 and 25, as indicated at 35 and 41, 43 and 45 respectively.

In the preferred embodiment described herein, it is assumed that the basic data word length is 16 bits, i.e. two bytes of binary data. For most purposes, an address for data will be considered then to comprise the location corresponding to the entire binary word. However, for such purposes where the separate bytes must be individually addressed, the binary address may comprise an additional bit which will be a zero for the first byte in the word and a one for the second byte.

Figure 2:
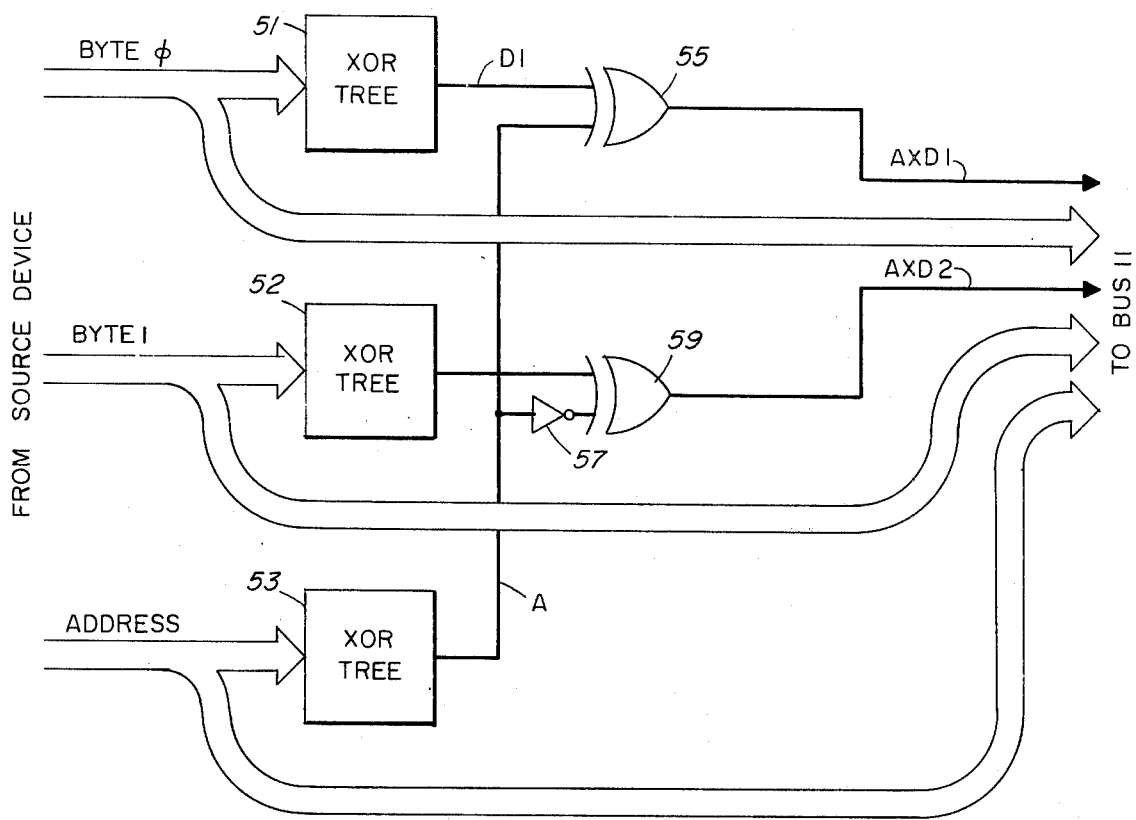
FIG. 2 is a block diagram illustrating a parity-generating network employed in the system of FIG. 1.

Apparatus for generating parity bits in accordance with the practice of the present invention is illustrated in FIG. 2. As shown there, an intermediate parity bit D1 is generated from the first byte of the data word, designated BYTE 0 while a second intermediate parity bit D2 is generated from the second byte in the data word, designated BYTE 1. Each of these intermediate parity bits is generated by means of a conventional array of logic gates, designated 51 and 52 respectively. The usual gate configuration performing this function is a tree array of exclusive OR gates and such arrays are commercially available in integrated circuit form from various sources, e.g. the Texas Instruments type 74180.

A third intermediate parity bit, designated A, is derived from the binary address associated with the data word. The intermediate parity bit A is again derived by a tree array of exclusive OR gates, designated 53, which may be similar to those indicated at 51 and 52 though this array will typically have to be significantly larger since the address will usually comprise a number of bits larger than eight. For example, in the case of the Lockheed SUE computer, the full binary address comprises 16 bits including the least significant bit required to distinguish between the two bytes of data comprising each of the 16-bit digital words which the SUE computer is adapted to process. The address is sourced to the bus 11 in conventional manner.

The intermediate parity bit A corresponding to the binary address is combined, in an exclusive OR gate 55, with the intermediate parity bit D1 corresponding to the first byte (BYTE 0) of the data word thereby to obtain a combinational parity bit designated AXD1. This combinational parity bit is sourced to the bus 11 with the data, BYTE 0.

The intermediate parity bit A is also complemented, i.e. by an inverting gate 57, and the resultant signal $\overline{A}$ is combined with the intermediate parity bit D2 in an exclusive OR gate 59, thereby obtaining a second combinational parity bit AXD2. This combinational parity bit is sourced to the bus 11 together with the second byte of the data word (BYTE 1). As will be understood by those skilled in the art, the inverting of the intermediate parity bit A is equivalent to obtaining, through a separate XOR tree, a parity bit corresponding to the exact address of the second byte (BYTE 1) since the addresses of the two bytes differ only in that the least significant bit of the address is a one in place of a zero. Since the output of an XOR tree network of gates will invert whenever any bit in the input is inverted, it will be seen that inverting the output is equivalent to inverting any single input bit. The same result may thus also be obtained by inverting the output of the XOR gate 59 rather than inverting one input.

Figure 3:
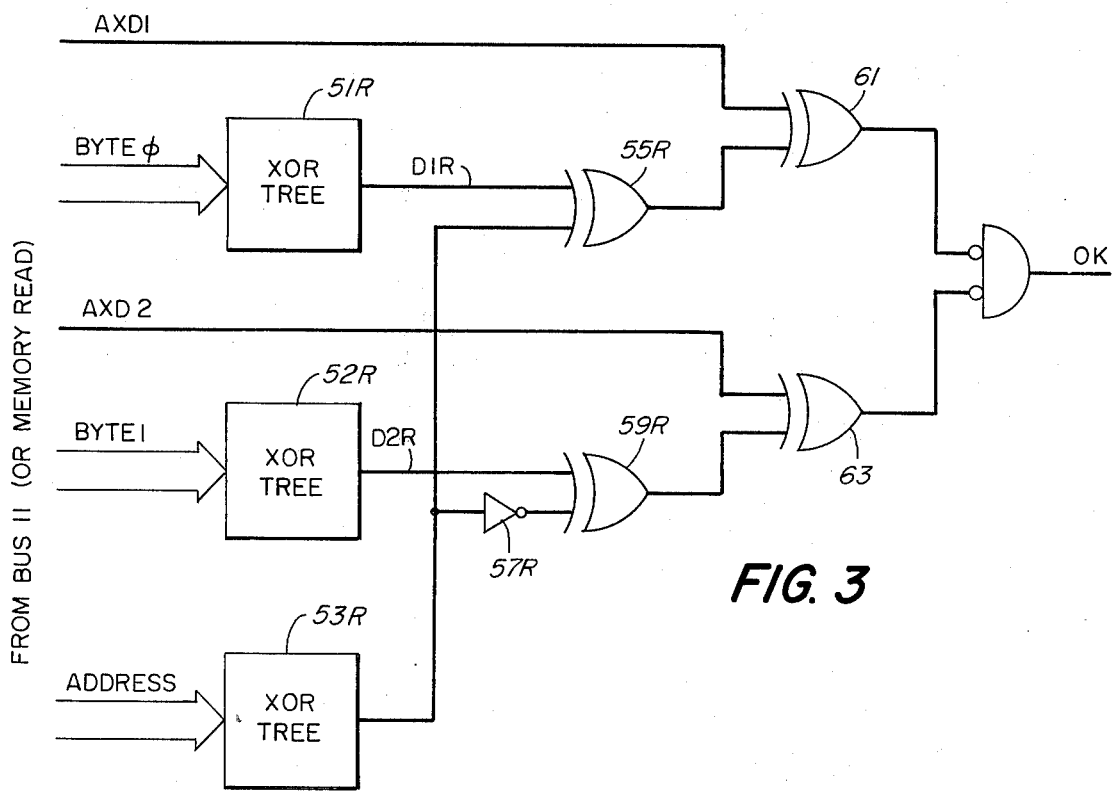
FIG. 3 is a block diagram illustrating a parity-checking network employed in the system of FIG. 1.

Circuitry for checking parity at a system sub-component receiving data through the main bus 11 is illustrated in FIG. 3. The receiving sub-component utilizes the address associated with the data word (which may be the peripheral's own identification) and the two bytes of the data words to independently generate corresponding intermediate parity bits, designated D1R, D2R, and AR, utilizing three networks of XOR gates 51R, 52R, and 53R which correspond to the analogous gate arrays shown in FIG. 2. As will be understood, the same gate arrays may be utilized, by the inclusion of appropriate control and timing circuitry, both for generating the intermediate parity bits on transmission as well as upon receiving so as to reduce circuit costs by, in effect, time-multiplexing the utilization of these devices.

In similar manner, the intermediate parity bit AR is combined with the intermediate bit D1R in an exclusive OR gate 55R. Also, the parity bit AR is complemented, as indicated at 57R, and combined with the intermediate parity bit D2R in an exclusive OR gate 59R. These independently-generated combinational parity bits are combined with the respective received combinational parity bits AXD1 and AXD2 in respective exclusive OR gates 61 and 63 to determine if a match exists. If the received parity bits match with the independently-generated combinational parity bits, the outputs from both gates 61 and 63 will be low. These output signals are combined in an AND gate 65 having inverting inputs so as to produce an output signal, designated OK, which will be high or true, i.e. a binary 1, when a match is obtained. As will be understood by those skilled in the art, this signal can be utilized to check and condition or inhibit the operation of the overall system in various ways. For example, a fault-checking sub-routine can be initiated if a mismatch is obtained, the particular routine being a function of the type of source which initiated or transmitted the data word.

As will likewise be understood by those skilled in the art, the parity-checking scheme of the present invention is equally applicable for checking memory operation. In this case, the combinational parity bits would be stored with the data word in memory. Then, when the memory word was read out, the combinational parity bits would be independently re-generated and compared with the stored combinational parity bits to determine if any errors had been introduced in either the write or read operations.

The advantages of the present error-checking scheme in detecting the four most common modes of failure identified previously may be understood as follows. If the readout from the bus or the memory read cycle is all zeros, including the stored or communicated parity bits, an error will be indicated since, if the data were all zeros, one of the parity bits should be a 1. This is so since the intermediate parity bit A is inverted before being combined with the intermediate parity bit corresponding to one of the two bytes comprising the data word. A similar logic dictates that one of the combinational parity bits will be a zero when the original data (both bytes) was all ones. A single bit failure in either byte of the data word will cause a corresponding change in the respective combinational parity bit as in conventional systems. However, if a single bit failure occurs in the binary address, this will affect and complement both combinational parity bits, thus serving to indicate not only that there was a failure of some sort but that the failure was most likely in the address, this being much more likely than the occurrence of simultaneous single bit failures in both bytes of the data word.

While the preferred embodiment has been described in the environment of a conventional data processing organization in which data words comprise a pair of conventional 8-bit bytes, it should be understood that the present invention is equally applicable to other possible systems in which data words may be divided into fields of different lengths. Similarly, while a division into two fields or bytes is contemplated in the preferred embodiment, division into a larger number of fields may also be accommodated since the nature of the exclusive OR function permits essentially theoretically unlimited expansion and further combinations of intermediate parity bits derived from the binary address with segments of the data word can be extended from the above-described organization in accordance with the principles of the present invention.

As will be understood by those skilled in the art, the present parity system will be useful in memory systems internally as well as in connection with transfers into and out of the memory unit. Accordingly, the term "sourcing" and "receiving" should be understood as being applicable to the internal transfers of data in a memory unit, e.g. the storing and retrieval of data in a magnetic core memory.

Likewise, while the preferred example employs respective XOR tree structures for generating respective parity bits corresponding to the separate bytes of the data word and to the address, it should be understood that the nature of the explainable XOR tree logic means that it is possible to configure circuit arrangements in which the separate tree structures are indistinct or even in which the input signals are, in effect, interlaced and still yield exactly equivalent output signal or signals. Accordingly, the invention should be understood to encompass such equivalents and the arrangement for generating the parity bits can appropriately be described as logical arrays equivalent to the several arrays separately defined.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a digital data processing system having sub-components which source and receive digital data comprising at least one binary word and in which the data source or destination is designated by a binary address; the improvement comprising means for generating a parity signal, which means employs a logical array equivalent to:

means for generating a parity bit A corresponding to the binary address;

means for generating a parity bit D corresponding to at least a portion of the data word;

means for generating and sourcing a parity bit AXD corresponding to the XOR product of A and D and also a second parity signal equivalent to $\overline{A}XD2$ where $\overline{A}$ is the binary complement of A and D2 is a parity bit corresponding to at least part of the data word, whereby a sub-component receiving the sourced data can detect the most common errors in either address or data.

2. A system as set fourth in claim 1 wherein D and D2 correspond to different and exclusive portions of the data word.

3. In a digital processing system having sub-components which source and receive digital data, in which the data comprises a binary word divisible into at least two fields and in which the data source or destination is designated by a binary address, the improvement comprising means for generating a pair of parity signals, which means employs a logical array equivalent to:

means for generating a parity bit A corresponding to the binary address;

means for generating a parity bit D1 corresponding to the first data field;

means for generating a parity bit D2 corresponding to the second data field;

means for generating and sourcing with the first data field a parity bit AXD1 corresponding to the XOR product of A and D1; and means for generating and sourcing with the second data field a parity bit AXD2 corresponding to the XOR product of A and D2, whereby a sub-component receiving the sourced data can detect most common errors in either address or data.

4. In a digital data processing system having sub-components which source and receive digital data, in which the data comprises a binary word divisible into at least two fields and in which the data source or destination is designated by a binary address; an error-checking scheme comprising:

means for generating a parity bit A corresponding to the binary address;

means for generating a parity bit D1 corresponding to the first data field;

means for generating a parity bit D2 corresponding to the second data field;

means for generating and sourcing with the first data field a parity bit AXD1 corresponding to the XOR product of A and D1; and means for generating and sourcing with the second data field a parity bit AXD2 corresponding to the XOR product of A and D2, whereby a sub-component receiving the sourced data can detect most common errors in either address or data.

5. A system as set forth in claim 4 wherein said means for generating a parity bit AXD2 includes means for providing an additional complement whereby, if the data word is all binary ones or all binary zeros, the two parity bits will be complements.

* * * * *